United States Patent [19]
Kainec

[11] Patent Number: 5,608,985
[45] Date of Patent: Mar. 11, 1997

[54] FISHING LINE ACCESSORY RELEASE DEVICE

[76] Inventor: Edward J. Kainec, 9460 Ledge Acres Rd., Macedonia, Ohio 44056

[21] Appl. No.: 472,498

[22] Filed: Jun. 7, 1995

[51] Int. Cl.$^6$ ............................................. A01K 91/00
[52] U.S. Cl. ................ 43/43.1; 43/44.87; 43/44.92; 43/44.95; 43/43.15
[58] Field of Search ........................ 43/44.87, 44.92, 43/43.1, 43.15, 44.95

[56] References Cited

U.S. PATENT DOCUMENTS

| | | | |
|---|---|---|---|
| 2,223,823 | 12/1940 | Hampton | 43/43.15 |
| 3,786,595 | 1/1974 | Croce | 43/44.87 |
| 3,827,175 | 8/1974 | Howard | 43/44.95 |
| 4,426,805 | 1/1984 | Riead | 43/44.95 |
| 4,748,764 | 6/1988 | Hammons | 43/43.1 |
| 5,253,447 | 10/1993 | Rhinehart | 43/43.1 |

FOREIGN PATENT DOCUMENTS 687010  2/1953  United Kingdom ............... 43/43.1

*Primary Examiner*—Joseph J. Hail, III
*Assistant Examiner*—Darren Ark
*Attorney, Agent, or Firm*—James H. Tilberry

[57] ABSTRACT

A mechanism for securing and releasing accessories, such as bobbers and sinkers, from fishing lines. The mechanism includes a snap eyelet hook to slidably fasten an accessory to a fishing line at any position on the line without threading the line through the eyelet or breaking the line. The mechanism also includes a releasable clamp to secure the accessory to the fishing line at any position on the line without threading the line through the eyelet or breaking the line. When a fish strikes the baited hook, the increased tension applied to the line by the strike releases the line from the clamp and permits the accessory to freely slide along the line. The fisherman can then reel in and net the fish without interference from an accessory otherwise permanently secured to the line a considerable distance from the fishing pole.

16 Claims, 4 Drawing Sheets

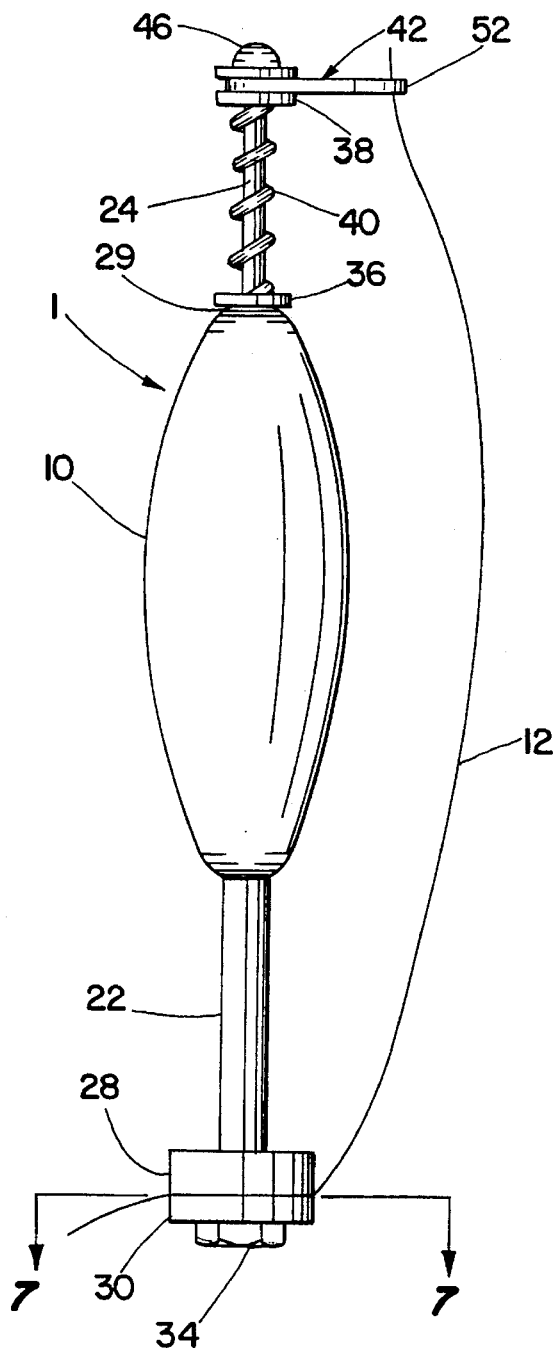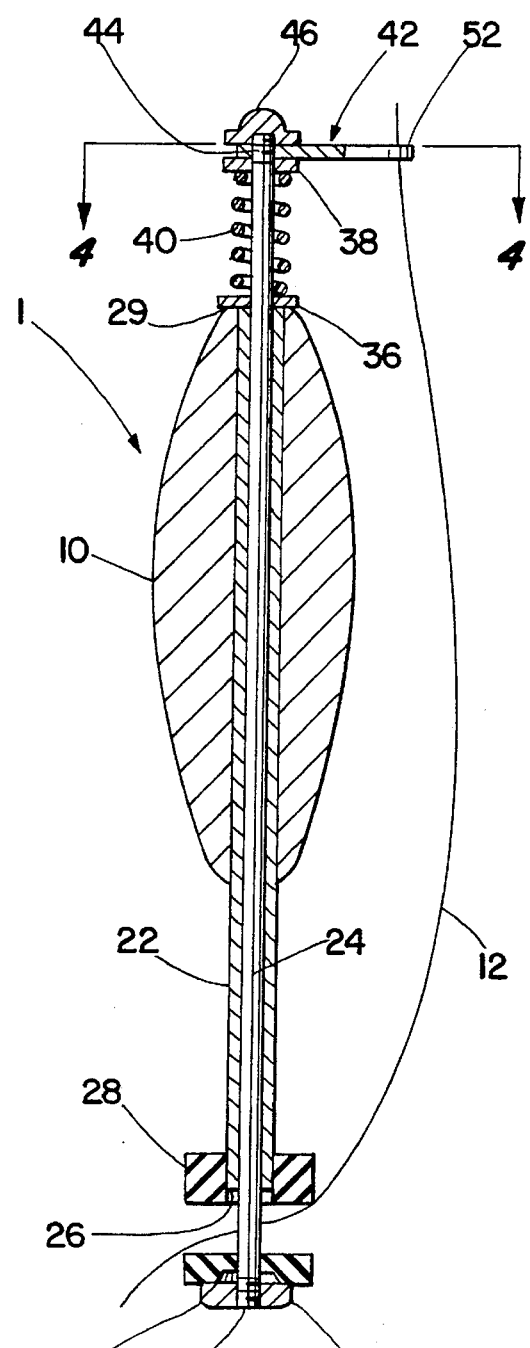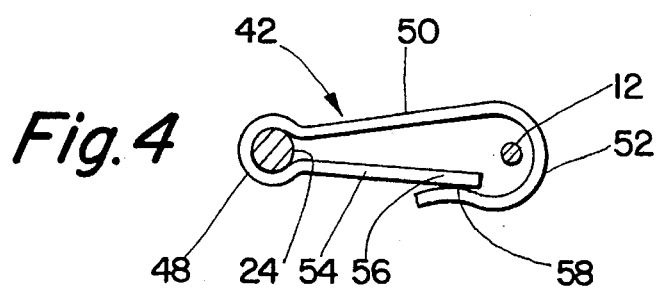

FISHING LINE ACCESSORY RELEASE DEVICE

BACKGROUND OF THE INVENTION

1. Field of the Invention

This invention relates in general to fishing tackle, and in particular to the means for fastening and unfastening fishing line accessories, such as bobbers, sinkers, and lures, to and from a fishing line.

2. Description of the Prior Art

It is customary with certain types of prior art fishing tackle to immovably secure fishing line accessories to fishing lines at predetermined positions on the fishing lines with or without threading the lines though the accessories. Once secured, the accessory cannot be quickly or easily removed without painstakingly disassembling the line, starting at the hook end and working back to the reel, or breaking the line.

Several efforts have been made in the prior art to address the problem of securing accessories to fishing lines. For instance, a prior art accessory called a slip bobber is mounted on a fishing line by threading the lead or hook end of the line through an eyelet on the bobber and securing a ferrule to the line between the bobber and the fishing pole. The bobber is therefore free to slide down the line, but is prevented by the ferrule from sliding up the line.

U.S. Pat. No. 2,895,255 to Irwin discloses a bobber with hard rubber serrated jaws which rigidly clamp a fishing line therebetween. These jaws are abrasive to the fishing line, and can only be separated by manual manipulation.

U.S. Pat. No. 3,466,788 to Potter discloses a means of positioning a sinker on a fishing line by providing a slot in the sinker approximately the thickness of the line. The fishing line is first threaded through an eyelet and is then wedged into the slot. The line is removable from the slot by means of a sharp jerk applied in the proper direction. If applied in the wrong direction, the line becomes more firmly wedged in the slot. No means are provided for removing the sinker from the line without disassembling the line or breaking it.

U.S. Pat. No. 3,747,254 to Caruso is a wooden clothes-pin type device for positioning a sinker on a fishing line. The line is threaded through an eyelet and wedged in a clothespin type gripping slot. Properly tensioned, the line can be removed from the slot, but, as in Potter, if the line is improperly tensioned, it will wedge more firmly in the slot. Also as in Potter, there are no means provided for removing the sinker from the line without disassembling or breaking the line.

U.S. Pat. No. 4,506,471 to Riead is an either/or clamping device wherein the line is either permitted to slide freely through the device or to be permanently clamped in the device at a selected position on the line, removable only by manual manipulation.

None of the above-noted prior art devices provides means for easily fastening an accessory to a fishing line, or removing it, while at the same time providing quick and reliable means for positioning the accessory on the line and quickly and reliably releasing it to freely slide on the line responsive to predetermined tensioning of the line.

SUMMARY OF THE INVENTION

The subject invention is a mechanism for improving the art of drifting, trolling, and in-place fishing, as distinguished from the arts of fishing with casting rods. In particular, the subject invention is a mechanism for improving the art of controlled depth fishing.

Experienced fishermen know the approximate depth of the body of water in which they are fishing, and know the wind and/or water currents, if any, as well as the species of fish they are attempting to catch and their feeding habits. For example, if a particular species of fish is known to feed approximately five feet from the bottom of a body of water thirty-five feet in depth, it follows that the hook or hooks should be set on a line which measures thirty feet between the hook and the bobber, which floats on the surface. Under these circumstances, in the past a thirty-foot line would be premeasured and permanently secured to a bobber, which, in turn, would be secured by continuation of the fishing line, to a fishing pole. However, bodies of water are not uniformly the same depth throughout. Thus, as the fisherman's boat drifts along the surface of the water, the hook at any given time may be above or below the optimum level best calculated to attract a particular species of fish to the bait.

The subject invention solves the problem with a bobber which can be quickly repositioned on the line so as to lengthen or shorten the distance from the bobber to the hook. This is accomplished by releasing the bobber from its position on the line, lowering the hook to detect the bottom, raising the hook from the bottom to the estimated feeding zone, and reattaching the bobber to the line at water level. This operation is quick and easy because the bobber can be shifted from place to place on the line without the necessity of rethreading the line and without the time-consuming disassembly of a semi-permanent accessory from the line-securing means.

In addition, when a fish strikes the bait, the bobber submerges and the impact from the jerk on the line by the fisherman setting the hook automatically releases the inventive bobber from its secured position on the line, thereby permitting it to slide along the line while the fish is being reeled in. Because the bobber is released to slide on the line, it does not interfere with bringing the fish close to the boat where it can be netted.

In a form of fishing referred to as horizontal bait presentation, the sinker is secured to the line a considerable distance from the hook, which causes the line to assume a level attitude when the line is pulled through the water, such as during trolling. The subject invention can be advantageously employed to secure the sinker to the line. Again, as with the inventive bobber, when a fish strikes the bait, the fisherman sets the hook and the impact on the line releases the sinker to slide along the line, thereby eliminating what would otherwise be an obstacle to reeling the fish to within close proximity of the boat.

OBJECTS OF THE INVENTION

It is therefore among the objects of the invention to provide means for quickly and efficiently attaching and detaching fishing line accessories to a fishing line; to provide means to release an accessory from a particular position on a line without removing the accessory from the line; to provide an accessory eyelet snap hook which enables the accessory to be mounted at any place on a line without threading the line through the eyelet snap hook or breaking the line; to provide means to secure an accessory on a fishing line by clamp means which automatically release the line from the clamp and without the requirement of manual manipulation by the fisherman; to provide accessory clamp means which will automatically release a fishing line therebetween upon application of predetermined tension to the line; and to provide accessory clamp means which will not cause a fishing line to hang up in the clamp if tension is applied to the line other than in a lineal direction.

The foregoing and other objects, features, and advantages of the invention will become apparent from the detailed description set forth hereinafter when considered in conjunction with the accompanying drawings.

BRIEF DESCRIPTION OF THE DRAWINGS

FIG. 2 is an elevational view of a preferred embodiment of the invention;

FIG. 3 is an elevational view in section of the preferred embodiment of the invention, as substantially shown in FIG. 2;

FIG. 4 is an enlarged partial view in section of the preferred embodiment of the invention taken along the line 4—4 of FIG. 3;

DESCRIPTION OF PREFERRED EMBODIMENTS OF THE INVENTION

Figure 1:
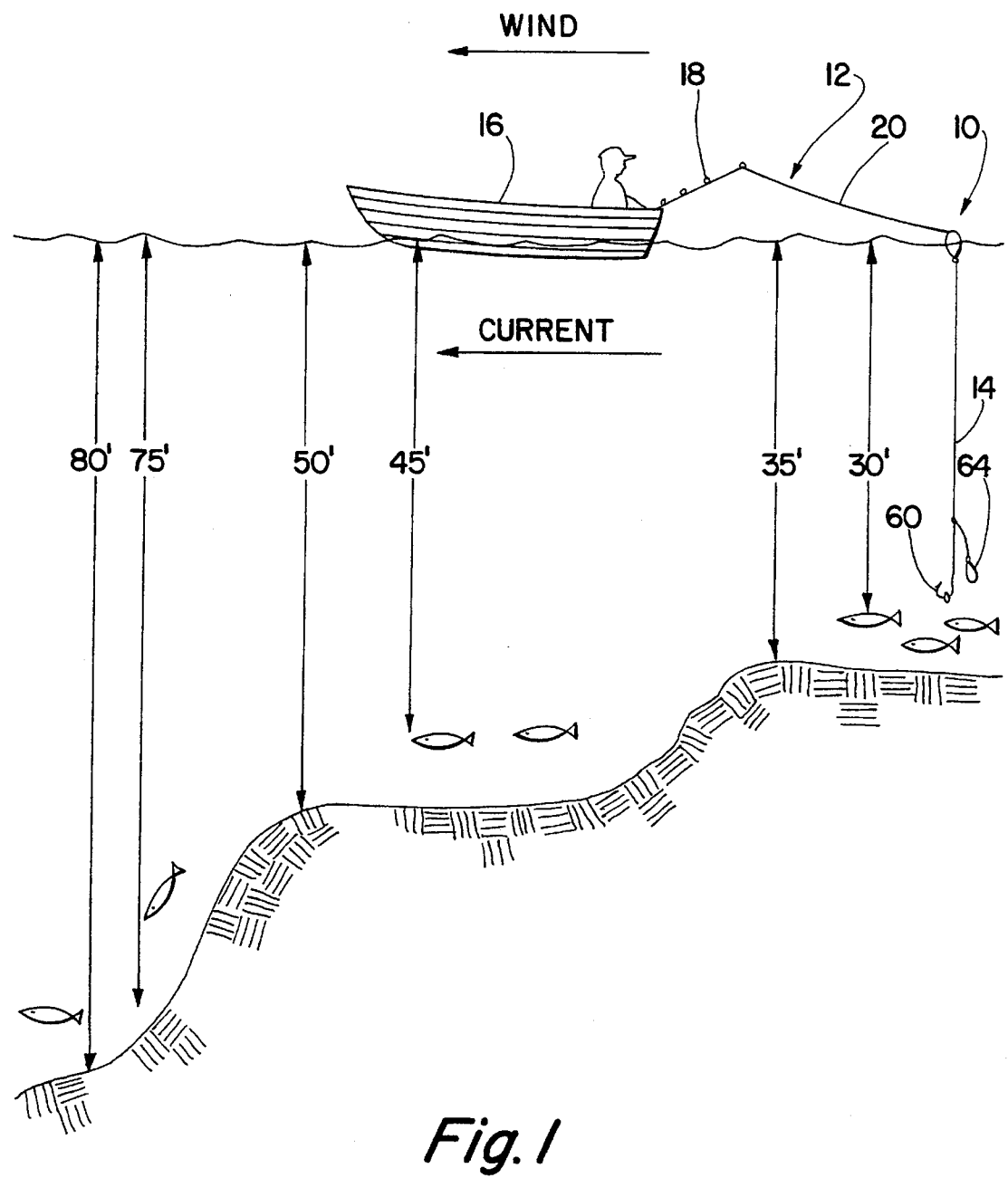
FIG. 1 is a schematic elevational view of a fisherman practicing the invention in a body of water of varying depth, using the vertical line bait presentation technique.

Referring to FIG. 1, therein is shown schematically a form of bobber fishing known as vertical line bait presentation in a body of water such as a lake, the depth of which varies from place to place. The inventive bobber is shown at 10. If the fisherman believes that the species of fish that he is attempting to catch feeds about five feet from the bottom, he baits his hook 60 on a portion 14 of line 12, approximately thirty feet from the inventive bobber 10, which is secured at the thirty-foot mark of the line. As the current or wind drifts the boat 16 out into deeper water, for example, to a fifty-foot depth, the bait, now fifteen feet from the bottom, is no longer attractive to the sought-after species of fish. Accordingly, the fisherman resets the inventive bobber 10 on the line forty-five feet from the bottom. Drifting into even deeper water would require that the bobber 10 once again be reset.

Once a fish is hooked, it is necessary to transfer the fish onto a stringer fastened to the boat or into a fish cooler in the boat. With a conventional bobber permanently secured at one location on the line 12, it is possible to reel in only the amount of line 20 between the fishing pole 18 and the conventional bobber. Thereafter, the fisherman must haul in the rest of the line 14 by hand before he can net or otherwise land the fish. However, with the inventive bobber 10, the inventive bobber releases to slide along the line, so as not to act as an obstacle to reeling in the line. The fish can then be brought into the boat.

Referring to FIGS. 2 and 3, therein is shown the inventive device 1 as adapted for use with bobber 10. As best shown in FIG. 3, a sleeve 22 passes axially through bobber 10 and is permanently secured to the bobber. A rod 24 freely passes through sleeve 22 to extend beyond the opposite ends 26 and 28 of the sleeve. A slip fit exists between sleeve 22 and rod 24. An elastoplastic disk 28 is permanently secured to the lower end 26 of sleeve 22, which is recessed within the lower end of disk 28. An elastoplastic disk 30 is permanently secured to the lower threaded end 32 of rod 24 and reinforced by nut 34 which threadedly engages lower end 32 of rod 22. Experimentation has determined disks 28 and 30 function most effectively if they have substantially an 80 durometer hardness.

At the upper end 29 of sleeve 22 rests a lower spring bearing plate 36, slidingly fitted about rod 24. An upper spring bearing plate 38 is slidingly fitted about rod 24, and a compressible spring 40 is encased between lower spring bearing plate 36 and upper spring bearing plate 38, and is compressible therebetween, as shown in FIG. 3. A fishing line eyelet snap hook 42 fits about the upper end 44 of rod 24 and is sandwiched between upper spring bearing plate 38 and rod cap 46, which is permanently secured to end 44 of rod 24. Eyelet snap hook 42 is best shown in FIG. 4 to comprise a small bight portion 48, which encircles the upper end 44 of rod 24, and a straight first leg portion 50 extending from small bight portion 48 to merge into a large bight portion 52. A second straight leg portion 54 extends from small bight portion 48. The free end 58 of large bight portion 52 overlaps the free end 56 of leg portion 54. The eyelet snap hook 42 is made from spring steel and free ends 56 and 58 are normally in pressure contact. The bobber 10 is mounted on the line 12 at any place by wedging the line 12 between free ends 56 and 58 until the line 12 slips into the confines of large bight portion 52.

With the line 12 within the confines of large bight portion 52 of eyelet snap hook 42, the bobber 10 is free to slide along the line 12. In order to secure the bobber 10 against sliding on the line 12, the fisherman holds bobber 10 between the fingers and palm of one hand in the upright position of the bobber 10 as shown in FIG. 2. His thumb is then positioned to press downward against rod cap 46, which pressure compresses spring 40 and pushes rod 24 downwardly through sleeve 22. As shown in FIG. 3, as rod 24 is depressed, disk 30 separates from disk 28. With his free hand, the fisherman then places line 12 between disks 28 and 30, and releases thumb pressure from rod cap 46. With the bobber gripping line 12, the fisherman then lowers the baited hook 60 into the water, as shown in FIG. 1. When a fish strikes the bait, the line between the bait and line-gripping disks 28 and 30 is tensioned by the fisherman setting the hook sufficiently to cause spring 40 to compress and to release pressure applied to the line between disks 28 and 30. Simultaneously, lower disk 30, which is soft enough to yield to the pressure of the line, deflects arcuately downward, away from upper disk 28, on the side of rod 22 adjacent to line 12. The combined movement of the separation of the disks 28 and 30 and the arcuate downward deflection of lower disk 30 results in an instant release of line 12 from between line-gripping disks 28 and 30. Bobber 10 is now free to slide along line 12 toward hook 60 as the fisherman reels in the line to net the hooked fish. As shown in FIG. 1, once the bobber is freed from a set position on the line and is no longer an obstruction on the line, the hooked fish can be reeled in to within a pole's length from the boat for easy netting or other recovery means of choice.

Figure 5:
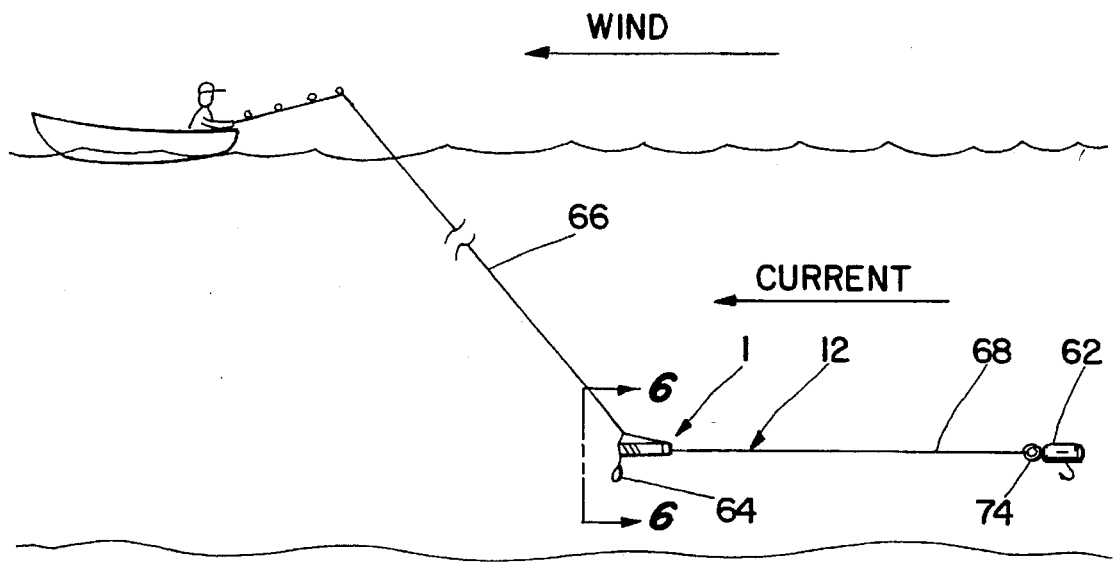
FIG. 5 is another schematic elevational view of a fisherman practicing the invention in a body of water, using the horizontal line bait presentation technique.
Figure 6:
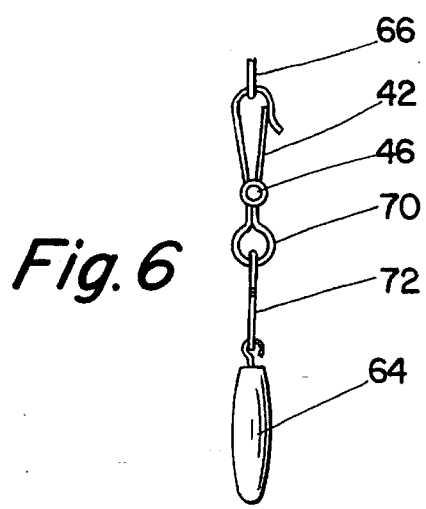
FIG. 6 is an enlarged plan view of a modification of the device shown in FIG. 4, taken along the line 6—6 of FIG. 5, for use in attaching sinkers to fishing lines in accordance with a preferred embodiment of the invention.
Figure 7:
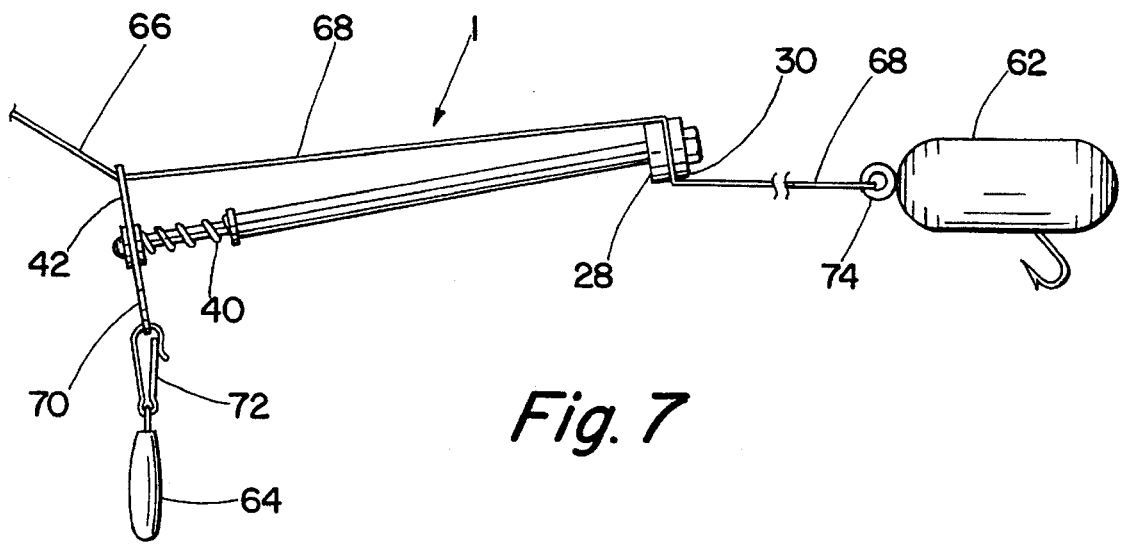
FIG. 7 is a partial enlargement of FIG. 5, showing in detail the application of a preferred embodiment of the invention with respect to sinkers.

A second preferred embodiment of the invention is shown in FIGS. 5, 6, and 7. FIG. 5 illustrates horizontal line bait presentation fishing, wherein the fisherman employs a hooked lure 62 to attract the fish instead of the hooked bait 60 shown in FIG. 1. The sinker 64, instead of being adjacent hooked bait 60, is fixed on line 12 approximately fifteen to twenty feet from the lure 62. Since lures are designed to be trolled horizontally, it is necessary to sink the line with one or more sinkers at a predetermined distance from the lure in order to level the line. Also, since a monofilament line is buoyant, sinkers are necessary to keep the line from floating to the surface. As a result, as shown in FIG. 5, properly weighted, line 12 assumes a V-shaped configuration with a slant portion 66 and a horizontal portion 68.

As shown in FIG. 6, which is an end view taken along the line 6—6 of FIG. 5, the eyelet snap hook 42 of FIG. 4 is modified to include an additional closed eyelet 70 to which sinker 64 is attached by means of an additional eyelet snap hook 72.

As more explicitly illustrated in FIG. 7, the inventive line grip and release device 1 is shown to receive line portion 66 through eyelet snap hook 42. Line portion 68 extends from eyelet snap hook 42 to the upper periphery of disks 28 and 30, between which the line is gripped. Line 68 exits from the disks 28 and 30 adjacent their lower periphery and is secured to eyelet 74 of lure 62. When a fish strikes the lure 62, line portion 68 is tensioned sufficiently to effect release of the line from between disks 28 and 30. Sinker 64 is then free to slide on line 12 so as not to obstruct the line when it is reeled in to land the fish.

Another application of the invention is in direct association with a lure. When fishing with lures, fishermen change the lures from time to time, determining which lure is most effective. The subject invention provides a quick and efficient means of changing from one lure to another.

Figure 8:
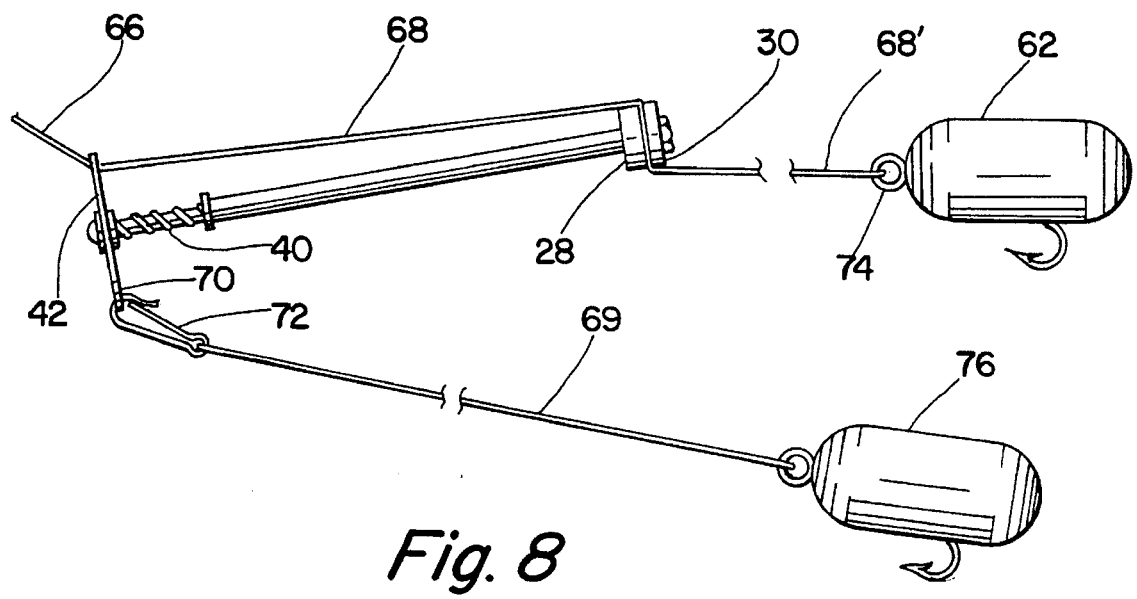
FIG. 8 is an enlargement of a preferred embodiment of the invention showing in detail the application of the invention with respect to fishing lures.

Referring to FIG. 8, lure 62 is shown to be permanently attached to the end of line portion 68, in the same manner as shown in FIG. 7. An additional lure 76 is secured to the inventive device 1 by means of eyelet snap hook 72 which connects to the eyelet 70 of eyelet snap hook 42 of the inventive device 1. Line 68 is then placed between elastoplastic gripping disks 28 and 30 by depressing spring 40. When spring 40 is released, the lure 76 is secured to the line 68 wherever gripped. To remove lure 76, the process is reversed. Spring 40 is depressed to release line 68 from between gripping disks 28 and 30, and eyelet snap hook 72 is disengaged from eyelet 70. Any number of extra lures may be attached and detached from line 12 in this manner by employing inventive device 1.

Figure 9A:
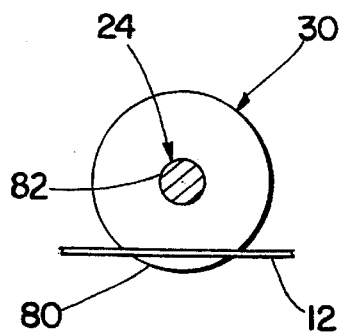
FIGS. 9A through 9D show the placement of a fishing line in the gripping component of the invention to vary the amount of tension on the fishing line required for release of the fishing line from the inventive device.
Figure 9B:
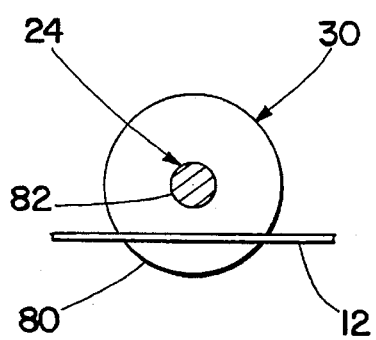
Figure 9C:
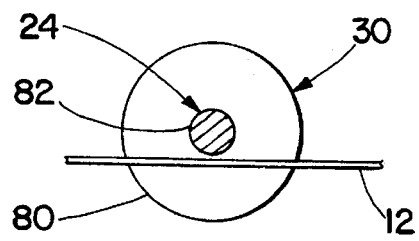
Figure 9D:
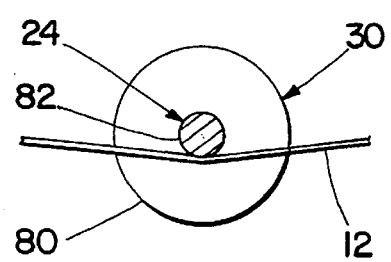

Reference is now made to FIGS. 9A through 9D. As shown in FIG. 9A, for a minimum line tension release, line 12 is positioned adjacent the peripheral edge 80 of elastoplastic disk 30. For a medium tension release, line 12 is positioned midway between the peripheral edge 80 of disk 30 and the peripheral surface 82 of rod 24, as shown in FIG. 9B. For a maximum tension release, line 12 is positioned near the peripheral surface 82 of rod 24, as shown in FIG. 9C. If line 12 is not to be released, line 12 is placed in contact with the peripheral surface 82 of rod 24, preferably with a slight wrap about peripheral surface 82, as shown in FIG. 9D.

It will occur to those skilled in the art, upon reading the foregoing description of the preferred embodiments of the invention, taken in conjunction with a study of the drawings, that certain modifications may be made to the invention without departing from the intent or scope of the invention. It is intended, therefore, that the invention be construed and limited only by the appended claims.

I claim:

1. A fishing line accessory gripping and releasing device comprising: a columnar sleeve having first and second opposite ends; a rod received within said sleeve to slide freely therein, said rod having first and second opposite ends projecting beyond corresponding opposite ends of said sleeve; a compressible spring having first and second opposite ends, encircling said first opposite end of said rod, said spring's second opposite end resting on said first opposite end of said sleeve; a pressure plate secured on said first opposite end of said rod, above and adjacent to said spring's first opposite end, placing said spring in compression between said pressure plate and said first opposite end of said sleeve; a first elastoplastic planar disk permanently secured about the said second opposite end of said sleeve; a second elastoplastic planar disk permanently secured about said second opposite end of said rod and concentric to said first elastoplastic planar disk, wherein said second elastoplastic planar disk is in an adjacent parallel plane with said first elastoplastic planar disk, said elastoplastic planar disks being placed in compression by said spring; and said spring being further compressible by holding said sleeve stationary and applying pressure to said pressure plate, and wherein said rod is shiftable through said sleeve and said second elastoplastic planar disk is shiftable away from said first elastoplastic planar disk responsive to tension applied to said fishing line, whereby said fishing line held between said planar disks is released.

2. The fishing line accessory gripping and releasing device of claim 1, including a bobber permanently secured to said sleeve.

3. The fishing line accessory gripping and releasing device of claim 1, including a snap hook secured to said first opposite end to receive a fishing line therethrough.

4. The fishing line accessory gripping and releasing device of claim 3, wherein said snap hook includes a closed loop eyelet.

5. The fishing line accessory gripping and releasing device of claim 4, including a sinker secured to said closed loop eyelet.

6. The fishing line accessory gripping and releasing device of claim 4, including a fishing lure secured to said closed loop eyelet.

7. The fishing line accessory gripping and releasing device of claim 1, wherein said second elastoplatic planar disk is adapted to yield to a predetermined pressure imposed thereon by predetermined tension in a fishing line held between said first elastoplastic planar disk and said second elastoplastic planar disk.

8. The fishing line accessory gripping and releasing device of claim 7, said second elastoplastic planar disk having a peripheral edge being deflectable downwardly along said peripheral edge responsive to pressure applied thereto by tension in a fishing line held between said first elastoplastic planar disk and said second elastoplastic planar disk.

9. The fishing line accessory gripping and releasing device of claim 7, wherein the fishing line tension required to separate said elastoplastic disks is a function of the radial distance of said elastoplastic fishing line from the center of said disks.

10. The fishing line accessory gripping and releasing device of claim 9, wherein elastoplastic disks will not release said fishing line when said fishing line is in pressure contact with said rod.

11. The fishing line accessory gripping and releasing device of claim 1, wherein said elastoplastic planar disks are adapted to receive a fishing line held therebetween, and said second elastoplastic planar disk is partially separable from said first elastoplastic planar disk responsive to tension applied to said second elastoplastic planar disk by said fishing line.

12. The fishing line accessory gripping and releasing device of claim 9, wherein said elastoplastic planar disks will not release said fishing line when said fishing line is in at least a partial wrap relationship with said rod.

13. The fishing line accessory gripping and releasing device of claim 7, wherein said second elastoplastic planar disk is partially deflectable downwardly responsive to tension applied to said second elastoplastic planar disk by said fishing line.

14. The fishing line accessory gripping and releasing device of claim 7, wherein said second elastoplastic planar disk has a peripheral edge and said peripheral edge is deflectable downwardly responsive to the position of said fishing line held between said elastoplastic planar disks and the tension in said fishing line.

15. A fishing line accessory gripping and releasing device comprising: a columnar sleeve having first and second opposite ends; a rod received within said sleeve to slide freely therein, said rod having first and second opposite ends projecting beyond corresponding opposite ends of said sleeve; a compressible spring having first and second opposite ends, encircling said first opposite end of said rod, said spring's second opposite end resting on said first opposite end of said sleeve; a pressure plate secured on said first opposite end of said rod, above and adjacent to said spring's first opposite end, placing said spring in compression between said pressure plate and said first opposite end of said sleeve; a first elastoplastic planar disk permanently secured about the said second opposite end of said sleeve; a second elastoplastic planar disk permanently secured about said second opposite end of said rod and concentric to said first elastoplastic planar disk, said elastoplastic planar disks being placed in compression by said spring, wherein said disks are adapted to receive a fishing line held therebetween and said disks are separable responsive to tension applied to said fishing line.

16. A fishing line accessory gripping and releasing device comprising: a columnar sleeve having first and second opposite ends; a rod received within said sleeve to slide freely therein, said rod having first and second opposite ends projecting beyond corresponding opposite ends of said sleeve; a compressible spring having first and second opposite ends, encircling said first opposite end of said rod, said spring's second opposite end resting on said first opposite end of said sleeve; a pressure plate secured on said first opposite-end of said rod, above and adjacent to said spring's first opposite end, placing said spring in compression between said pressure plate and said first opposite end of said sleeve; a first elastoplastic planar disk permanently secured about the said second opposite end of said sleeve; a second elastoplastic planar disk permanently secured about said second opposite end of said rod and concentric to said first elastoplastic planar disk, said elastoplastic planar disks being placed in compression by said spring, wherein said second elastoplastic planar disk is adapted to yield to a predetermined pressure imposed thereon by predetermined tension in a fishing line held between said first elastoplastic planar disk and said second elastoplastic planar disk, and wherein the fishing line tension required to separate said disks is a function of the radial distance of said fishing line from the center of said disks.

* * * * *